Sept. 15, 1970      E. R. JORNOD      3,529,182
TIME PROPORTIONING FEEDBACK BETWEEN DISTINCT
CIRCUITS IN A CONTROL SYSTEM Filed May 5, 1967      2 Sheets-Sheet 1

INVENTOR.
EUGENE R. JORNOD
BY
Wolfe, Hubbard, Voit & Osann
ATTORNEYS

INVENTOR.
EUGENE R. JORNOD

United States Patent Office 3,529,182
Patented Sept. 15, 1970

3,529,182
TIME PROPORTIONING FEEDBACK BETWEEN DISTINCT CIRCUITS IN A CONTROL SYSTEM
Eugene R. Jornod, Rockford, Ill., assignor to Barber-Colman Company, Rockford, Ill., a corporation of Illinois
Filed May 5, 1967, Ser. No. 636,336
Int. Cl. H03k 3/26
U.S. Cl. 307—284    6 Claims

ABSTRACT OF THE DISCLOSURE

An improvement in on-off condition controlling systems wherein a first proportional circuit responsive to an error signal utilizes a differential amplifier served by one voltage source to supply an output signal to a second on-off circuit served by another voltage source, and wherein the step changes in a voltage occuring in the second circuit are coupled back through a permanently connected chargeable and dischargeable capacitor to the first circuit with a negative feedback sense, so that a time-proportioned response is obtained.

---

This invention pertains in general to control systems wherein a variable condition such as temperature, pressure, or the like is in response to an error signal brought to and maintained at a desired set point. More particularly, the invention relates to such control systems with on-off response and wherein the on-off duty cycle is proportioned according to the magnitude of the error within a predetermined band about the set point.

Time-proportioning control systems have been well known and widely used in the art, and it has been a common practice to utilize the exponentially changing voltage across a capacitor, which is charged and discharged in response to changes in the system state, as a feedback signal which causes the system to switch back and forth with a duty cycle varying as the error increases or decreases. When proportional amplifying circuits of certain types, for example, those using differential amplifiers, are employed to create an output signal which foms the input to a level-discriminating on-off circuit, the two circuits must be supplied with operating power from separate voltage sources. Feedback couplings between separate circuits served by separate voltage sources for the purpose of effecting time-proportioned response have, as a general matter, heretofore included nonelectrical links, so as to avoid direct and adverse intercoupling of the two electrical circuits. For example, it has been proposed to connect an electrical heater for energization and deenergization in the on-off circuit, and to dispose that heater physically so it influences a temperature sensitive resistor in the first circuit. In other cases, a relay has been employed with its coil controlled by the on-off circuit and its electrically separate contacts connected in the first circuit to create time-proportioning feedback action.

It is the general aim of the present invention to bring forth an improvement by which permanently and directly connected electrical components provide a time-proportioning negative feedback in a control system which utilizes first and second circuits served by separate and distinct operating voltage sources.

A related object is to do away with the expense, complexity and slow response of feedback coupling utilizing non-electrical links between the two circuits in systems of the type discussed above.

In brieff, it is an objective of the present invention to provide negative feedback between two separate circuits in order to obtain a time-proportioning response, and wherein this is achieved by very few, simple, standard, low-cost components permanently connected electrically and operating with high reliability and speed.

While the invention has been shown and will be described in some detail with reference to particular embodiments thereof, there is no intention that it thus be limited to such detail. On the contrary, it is intended here to cover all alterations, modifications, and equivalents falling within the spirit and scope of the invention as defined by the appended claims.

Figure 1:
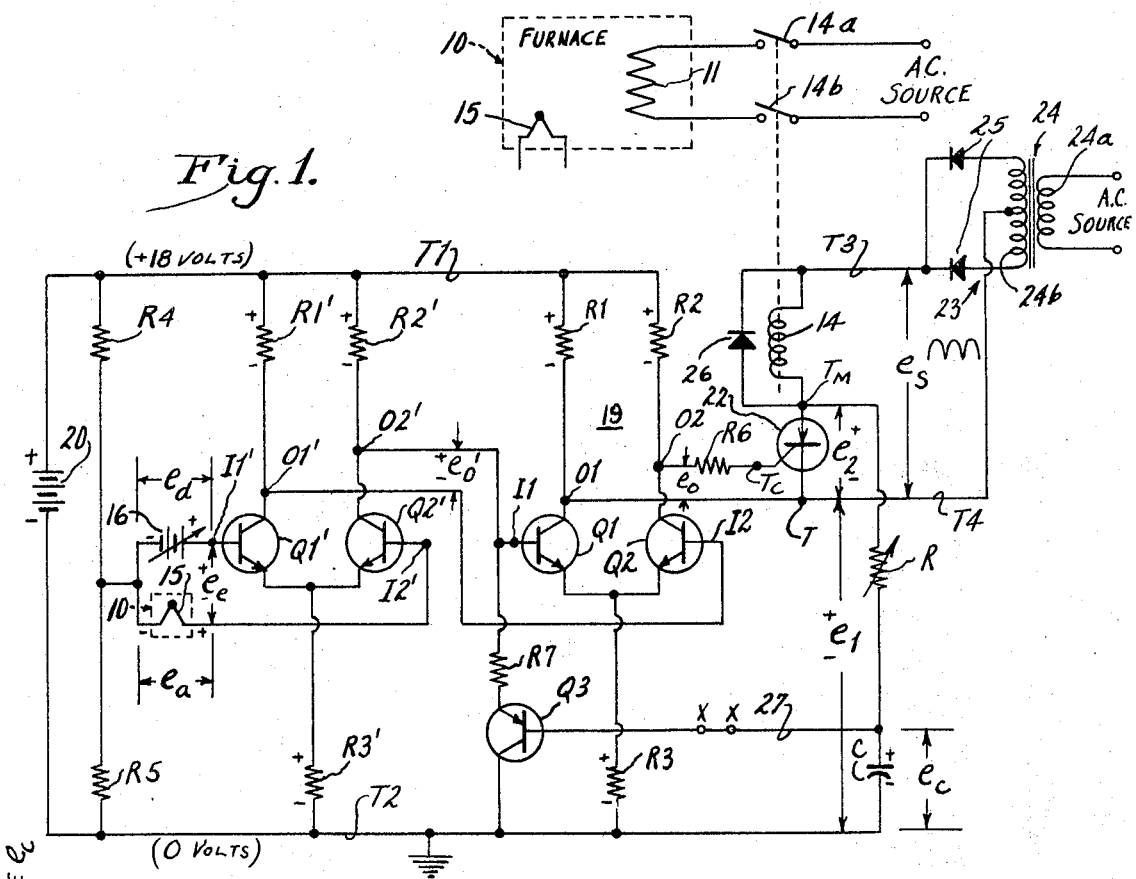
FIG. 1 is a schematic circuit diagram of an on-off control system which includes an exemplary embodiment of the present invention.

Merely as an example of the various changeable conditions which may be controlled, FIG. 1 shows a system embodying the invention and arranged to control the temperature within a furnace 10 containing a resistance heating element 11 adapted to be connected to and disconnected from an AC voltage source 12 by closure or opening of contacts 14a, 14b in response to excitation or de-excitation of an associated circuit breaker or relay coil 14. The relay is typical of many final control devices which might be used to change the furnace temperature in response to current excitation or de-excitation. When the contacts 14a, 14b are closed, energization of the element 11 will cause the furnace temperature to increase, and when such contacts are open, the furnace temperature will decrease due to heat losses to the surrounding ambient atmosphere.

To sense and signal the actual value of the controlled condition, a thermocouple 15 is disposed within the furnace and, in well known fashion, produces a voltage $e_a$ thereacross which is generally proportional to the actual temperature. The thermocouple 15 appears twice in FIG. 1 merely to indicate that it is physically located in the furnace 10, and electrically connected in an amplifier circuit where the temperature-representing voltage $e_a$ is utilized in a manner to be made clear.

To signal a desired or set point temperature, means are provided to produce a variable point voltage $e_d$. Such means might take a variety of forms, but for the sake of simplicity and schematic illustration in FIG. 1, an adjustable battery 16 has been illustrated. An error signal $e_e$ proportional to the difference between the desired and actual temperature values is obtained by connecting the voltages $e_d$ and $e_a$ in series bucking relation so that one subtracts from the other. Normally, the error $e_e$ will have the indicated polarity, but it is possible for it to drop to zero or reverse in polarity if the furnace temperature rises appreciably above the desired set point. When the actual and desired temperatures agree, the error signal $e_e$ will have a small finite magnitude of the indicated polarity.

For the purpose of amplifying the very small error voltage $e_e$, and the variations which occur therein, so that a final control element may be governed according to the magnitude of the error, a differential amplifier is employed and in the present instance two such amplifiers 18, 19 are shown connected in tandem. The operating voltage for these amplifiers is supplied from a battery 20 having terminals T1 and T2 here shown by way of example as residing at +18 volt and reference or ground (zero) potentials. The battery 20 is schematically representative of any suitable DC voltage source well known to those skilled in the art, such as a power supply constituted by a transformer energized from AC mains and associated with a full wave rectifier and a filter.

Differential amplifiers of the type here shown are familiar to those skilled in the art. It will suffice to observe that the amplifier 19 comprises first and second transistors Q1' and Q2' (which in this instance are of the NPN type) having load resistors R1' and R2' interposed between their collectors and the positive voltage supply terminal T1. The emitters of these transistors are connected together and through a common emitter resistor R3' to the negative terminal T2. The input signal or error voltage $e_e$ is applied between the input terminals I1', I2' constituted by the bases of the two transistors, and the corresponding, amplified output signal $e_o'$ appears between the two collectors which constitute output terminals O1' and O2'. To provide an operating or bias voltage between the base-emitter junctions of the two transistors, and from which changes in the input signal $e_e$ cause variations, a voltage divider is formed by two resistors R4, R5 connected between the terminals T1, T2 with their junction being connected to the junction between the thermocouple 15 and the set point voltage source 16.

In operation, if the set point voltage $e_d$ is increased or decreased (while the temperature-representing voltage $e_a$ remains constant), the forward voltage and current at the emitter-base junction of the transistor Q1' increases or decreases, so that the collector-emitter current through that transistor increases or decreases, thereby not only increasing or decreasing the voltage drop across the load resistor R1' but also the voltage drop across the common inter-coupling resistor R3'. The change in voltage across the resistor R3' thus increases or decreases the potential at the emitter of the transistor Q2', and reduces or increases the forward bias across the base-emitter junction of that transistor. Thus, the collector-emitter current through the transistor Q2' decreases or increases until the resulting decrease or increase in the voltage drop across the resistor R3' brings the inter-coupled transistors to a new steady state of conduction levels due to the cross coupling provided by the common resistor R3'. Because of the decrease or increase of the potential at the terminal O1' resulting from an increase or decrease in the voltage $e_d$, and the resulting increase or decrease in the potential at terminal O2', the output voltage $e_o'$ will increase or decrease in magnitude.

The opposite effect will obtain when the temperature-signaling voltage $e_a$ increases or decreases (and assuming that the voltage $e_d$ remains constant). That is, the base-emitter voltage for the transistor Q2' will increase or decrease, causing greater or lesser collector-emitter current flow, so that the potential at terminal O2' will decrease or increase, and the voltage drop across the resistor R3' will increase or decrease. The latter effect reduces or increases the base-emitter voltage for the transistor Q1', so that the collector-emitter current through this transistor decreases or increases, causing the potential at terminal O1' to increase or decrease. In consequence, an increase or decrease in the temperature-signaling voltage $e_a$ will cause a decrease or increase in the output voltage $e_o'$ from the amplifier 18.

Viewed in its entirety, the differential amplifier 18 responds to the difference between the two signals $e_d$ and $e_a$. The output voltage $e_o'$ is simply an amplified reproduction of the error voltage $e_e$. The simplicity, low cost, reliability, and very high gain obtainable from such a differential amplifier makes its use desirable and advantageous in many types of control systems.

A single differential amplifier may suffice if its gain is adequate. But where greater total gain is desired, the second, tandemly connected amplifier 19 may be used. For brevity, the individual components of the amplifier 19 are identified in FIG. 1 by the same reference characters employed for corresponding components in the amplifier 18, except that the distinguishing prime signals associated with reference characters for the amplifier 18 are omitted in connection with the amplifier 19. For all intents and purposes, the output signal $e_o'$ from the first amplifier 18 may be considered simply as constituting the error signal, and this would be the arrangement employed where one differential amplifier is necessary. This equivalent error signal $e_o'$ is applied between the input terminals I1, I2 and variations in the error voltage $e_e$ thus normally cause the output voltage $e_o$ from the amplifier 19 to vary in accordance with changes in the temperature error.

It may be observed at this point that the output signal $e_o$ appearing between the output terminals O1, O2 depends upon the relative magnitudes of the voltage drops across the load resistors R1 and R2, so that the output signal does not have any direct reference or relation to the potential of either of the voltage source terminals T1 or T2.

The error signal $e_e$ after amplification in one or two stages is sufficiently great in magnitude to serve as the input to a level-discriminating control element which determines the state of a current responsive device arranged to increase or decrease the value of the controlled condition. As here illustrated, the final control element is a triggered electronic valve and specifically a silicon controlled rectifier 22 which may be viewed as having three terminals, viz, a control terminal Tc formed by its gate element electrode, a common terminal T formed by its cathode, and a main terminal Tm formed by its anode. The current-responsive device is constituted by the relay heretofore described having the coil 14 responsive to excitation or de-excitation for closing or opening the contacts 14a, 14b and thus for increasing or decreasing the temperature in the furnace 10.

To control the energization of the coil 14, the latter is connected in series with the anode-cathode path Tm-T of the silicon controlled rectifier 22 and an appropriate second source of operating voltage source 23. The second source of operating voltage is provided here by a transformer 24 having its primary winding 24a connected to conventional A.C. power lines, the extremities of its secondary winding 24b being connected through rectifying diodes 25 to a first terminal T3, and a center tap being connected to a second terminal T4. The source voltage $e_s$ between these latter terminals T3, T4 is thus a pulsating D.C. voltage due to the full wave rectification which occurs, such pulsating voltage having a peak value of, say, 25 volts and making the terminal T3 positive relative to the terminal T4. Because the source voltage $e_s$, the relay coil 14, and the anode-cathode path of the SCR 22 are connected in series, the coil will be energized with pulsating current whenever the SCR is conductive, i.e., "fired" during each pulsation. The inertia of the relay holds the contacts 14a, 14b closed if the SCR fires during successive pulsations of the source voltage, even though the current instantaneously drops to zero at the end of each pulsation and the SCR is momentarily non-conductive. A diode 26 is conventionally connected in parallel with the coil 14 and poled to conduct in a direction opposite to excitation current flow, so as to dissipate the inductive "kickback" voltage induced in the coil when the SCR 22 cuts off.

To complete the basic control system, the output terminal O2 of the amplifier 19 is connected through a current-limiting resistor R6 to the control terminal Tc and the gate of the SCR 22; and the output terminal O1 is connected to the common terminal T or the cathode of the SCR 22. Thus, the output voltage $e_o$ is applied between the cathode and gate of the SCR with a polarity normally making the latter positive with respect to the former. When the output voltage $e_o$ is less than the critical "firing" potential for the SCR (at the assumed peak value of 25 volts for the source voltage $e_s$) the SCR will remain off, and the relay coil 14 will be deenergized to let the furnace temperature decrease. Conversely, when the output voltage $e_o$ exceeds the "firing" poetential for the SCR 22, the latter will conduct during each pulsation of the source voltage and the relay 14 will be excited to close the contacts 14a, 14b, thereby to cause the resistance element 11 to increase the furnace temperature.

As thus far described, the simple on-off control system would lack any reasonable degree of stability because the thermal inertia of the furnace would cause the temperature greatly to overshoot and cycle about the set point. To reduce the cycling to a very small range, and yet to provide reasonable speed of corrective action when the error is large, it is an accepted practice to supplement an on-off system so that the condition-correcting element is turned on and off with a duty cycle which makes the ratio of the durations of the on and off periods generally proportional to the error within a proportioning band. This is usually accomplished by negative feedback from the final control eelment to the amplifier which makes the system, when on, turn off before the temperature rises to the set point and which makes the system, when off, turn on before the temperature drops below the set point.

In the arrangement here shown, however, the first voltage source 20 is and must be separate and distinct from the second voltage source 23. The positive terminals T1 and T3 of the first and second voltage sources are not common, and the negative terminals T2 and T4 are not common. Indeed, in the illustrated case where differential amplifiers are employed, the two source voltages differ in nature, i.e., one is D.C. and the other is pulsating D.C. An ordinary feedback connection is not possible.

In accordance with the present invention, the amplifier circuit, served by the first voltage source 20, and the on-off circuit, served by the second voltage source 23, are permanently interconnected in a manner such that the latter affects the former to produce time-proportioning action for the system as a whole by means which cause a feedback signal to vary as a time function of the sum of a first voltage in the first circuit and a second changeable voltage in the second circuit. In this way, a feedback voltage is made to vary with reference to the first source terminal T2, and it is algebraically combined with or subtracted from the error signal.

In the embodiment of FIG. 1, this is accomplished by connecting the first plate of a capacitor C to the terminal Tm (that is, to the junction between the SCR 22 and the relay coil 14) and by connecting the second plate of the capacitor to the terminal T2 of the first voltage source. Preferably the first such connection is made through an adjustable resistor R which may be varied to change the time constant with which the capacitor charges and discharges. The capacitor C is thus subjected to a voltage which is the sum of a first voltage shown as $e_1$ (appearing between the terminals T and T2) and a second voltage $e_2$ (appearing across the SCR 22), the latter voltage switching between two values as the SCR switches between its on and off states. The voltage $e_c$, measured with reference to terminal T2 and varying exponentially as the capacitor C charges and discharges, is coupled to that one of the input terminals for the differential amplifier 19 which results in a negative feedback response. For this purpose, a PNP transistor Q3 is arranged with its base connected via a line 27 to the upper plate of the capacitor C, its collector connected to the terminal T2, and its emitter connected through a resistor R7 to the input terminal I1. In this arrangement, the base-emitter junction of the transistor Q3 functions as a Zener diode, and it is reversely conductive because the capacitor voltage $e_c$ is greater than the potential at the input terminal I1. The base-collector junction is not conductive, and the collector may, if desired, be left disconnected. As the voltage $e_c$ decreases or increases, reverse current flow through the base-emitter junction of the transistor Q3 and through the resistor R7 decreases or increass so that the potential at input terminal I1 will decrease or increase, thereby decreasing or increasing the output voltage $e_o$ so that it falls away from or approaches the "firing" level for the SCR 22. In effect, variations in the capacitor voltage $e_c$ are applied to the input terminal I1 and are combined with the input signal $e_o'$ for the amplifier 19.

Figure 2:
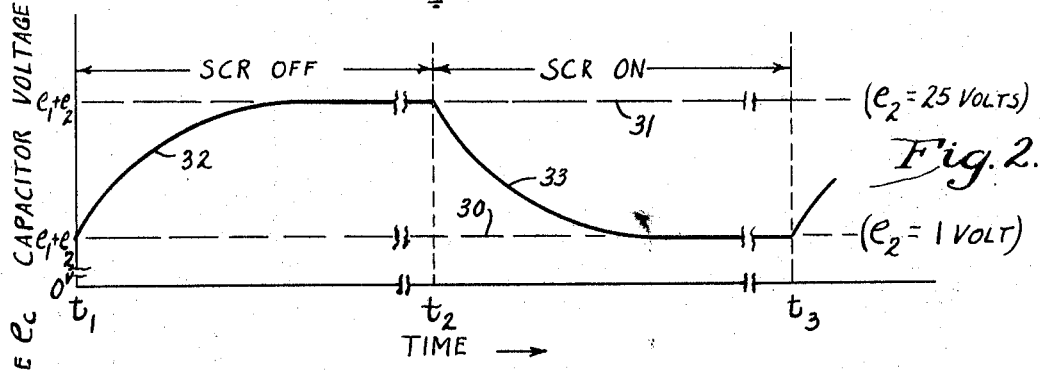
FIG. 2 is a graphic illustration of the manner in which a certain voltage varies in the apparatus of FIG. 1 when the feedback connection is open.

The operation of this simple and permanent negative feedback interconnection may best be understood by considering for a moment what would happen if the line 27 were broken at $x$—$x$. Under these conditions, the voltage $e_c$ will have no effect upon the amplifier 19 or the SCR 22. When the SCR 22 is conductive, the voltage $e_2$ thereacross will be very small (e.g., a pulsating voltage of one or two volts in peak value) and the capacitor voltage $e_c$ will reach a steady state value represented at 30 in FIG. 2 which is essentially equal to the voltage $e_1$. If now at instant $t_1$, the SCR 22 is turned off, then the voltage $e_2$ thereacross will become equal to the source voltage $e_s$, i.e., it will increase to a pulsating voltage of about 25 volts in peak value. The capacitor C will thus charge in incremental steps during the next few pulsations of the voltage $e_s$ until the votlage $e_c$ reaches a higher value equal to the sum of the voltage $e_1$ plus 25 volts. This higher value is represented in FIG. 2 by the horizontal line 31. Because of this charging of the capacitor C as a result of the abrupt increase in the voltage $e_2$ when the SCR turns off at instant $t_1$, the voltage $e_c$ will rise exponentially as shown by the curve portion 32 in FIG. 2 and which for simplicity has been drawn to omit any representation of the fact that the charging occurs in successive steps due to successive pulsations of the voltage $e_s$. The time required for the capacitor voltage to exponentially rise from the lower level 30 to any given higher level will depend upon the charging time constant, and this may be varied by adjusting the value of the resistor R.

Now, if the SCR 22 is turned on at a later instant $t_2$ (FIG. 2), the voltage $e_2$ will drop abruptly from 25 volts peak value to only one or two volts peak value. As a result, the capacitor C will discharge and its voltage $e_c$ will decrease exponentially as shown at curve portion 33 in FIG. 2. Thus, FIG. 2 makes it clear that the capacitor voltage $e_c$ will rise exponentially from a first low to a second high value, and will fall exponentially from the second to the first value when the SCR respectively switches off or on, the span between the first and second values substantially equal to the peak value of the pulsating source voltage $e_s$ when there is no negative feedback connection.

Figure 3:
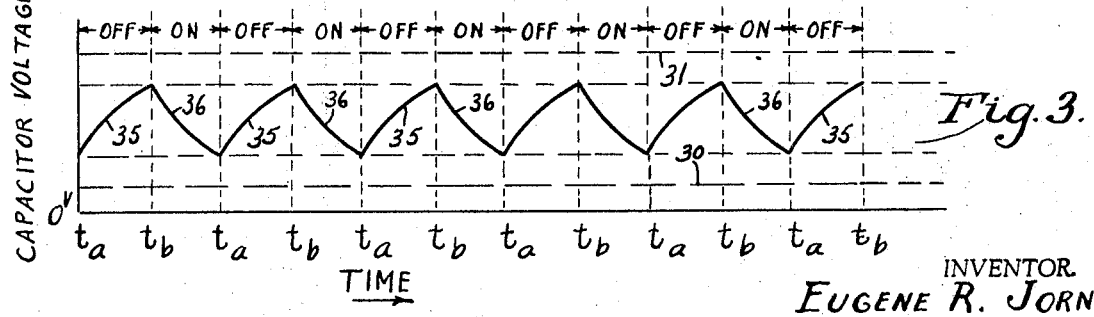
FIG. 3 is a graphic illustration of variations of the same voltage during operation of the apparatus with feedback.

Consider now the operation depicted by FIG. 3 with the connection at $x$—$x$ completed for feedback operation. It will be assumed for purposes of discussion that the error voltage $e_e$ and its amplified counterpart voltage $e_o'$ remain constant. After the SCR 22 has been cut off, and the voltage $e_2$ is at its high value, the voltage $e_c$ will be exponentially increasing (as represented by curve portion 35 in FIG. 3) toward the upper limit value represented at 31. But the increasing voltage $e_c$ which is transferred via the reversely conductive emitter-base junction of the transistor Q3 to the input terminal I1 in effect makes the input voltage $e_o'$ appear as if it is increasing even though the error signal $e_e$ remains the same. At the instant $t_b$ (FIG. 3) the output voltage $e_o$ reaches a magnitude sufficient to trigger the SCR 22, and in consequence the relay 14 is energized, the voltage $e_2$ drops abruptly to its lower value, and the capacitor voltage $e_c$ begins exponentially decaying (curve portion 36 in FIG. 3) toward the lower value represented at 30. Thus, the net input signal to the differential amplifier 19 exponentially decays until the output voltage $e_o$ is reduced below the firing potential for the SCR 22 (at the next instant $t_a$) and the latter is cut off to deenergize the relay coil 14. This sequence repeats over and over with the capacitor C being charged (and the relay 14 deenergized) during the time intervals $t_a$–$t_b$, and the capacitor being discharged (and the relay 14 excited) during the time intervals $t_b$–$t_a$. Thus, when the furnace heater 11 is energized by the relay 14 in response to conduction of the SCR 22, the feedback arrangement acts to turn off the SCR 22 and the heater 11 after a delay interval $t_b$–$t_a$; and when the heater 11 is deenergized due to non-conduction of the SCR 22, the feedback arrangement acts to turn them on again after a delay interval $t_a$–$t_b$.

The value which the capacitor voltage must reach during the exponential charging represented by curve portions 35 before the SCR 22 turns on is in general less than the maximum value 31 (FIG. 2) and depends upon the magnitude of the error voltage $e_e$, that is, the contribution which the error voltage $e_e$ makes to the amplifier input voltage $e_o'$. As the furnace temperature rises toward the set point, and the error voltage $e_e$ becomes smaller, the value of the capacitor voltage $e_c$ required to turn on the SCR 22 after the latter cuts off will become greater, and thus the "off" periods $t_a$–$t_b$ during which the capacitor C charges will become longer. Because the capacitor voltage $e_c$ begins rising with a steep slope, the "off" periods will be short when the error voltage $e_e$ is large, but as the error voltage decreases the "off" periods will become longer because the slope of the capacitor voltage flattens out as it rises more toward the asymptotic maximum. Thus, as the furnace temperature increases toward the set point and the error voltage decreases toward the bias value representative of zero error, the "off" periods will become progressively longer, the average rate of heat injection into the furnace will decrease, and the rate of temperature rise will decrease until at equality of set point and actual temperatures the "on" and "off" periods will become approximately equal and the average rate of heat injection will just balance heat losses from the furnace. This latter condition is illustrated in FIG. 3. Of course, if the furnace temperature for any reason is above the set point, the error voltage $e_e$ will be even less than its zero-error bias value, and the "off" periods will be even longer.

On the other hand, the capacitor voltage $e_c$ will exponentially decay (curve portions 36) toward the value 30 during those intervals when the SCR 22 is turned on. As the furnace temperature increases toward the set point and the error voltage $e_e$ decreases, the low excursions of the capacitor voltage $e_c$ (which must be reached by exponential discharge to reduce the output signal $e_o$ below the "firing" level for the SCR 22) will become progressively higher in value. The periods occupied by capacitor discharging will become pregressively shorter. Thus, as the furnace heats up toward the set point, the "on" periods $t_b$–$t_a$ will become progressively shorter until they are approximately equal to the "off" periods at set point conditions. Increases in the furnace temperature above the set point will cause even further shortening of the "on" periods.

The foregoing explanation has for the sake of simplicity purposely neglected the fact that there are small cyclic variations in the furnace temperature due to the on-off energization of resistance element 11. These cyclic variations are reflected with a phase lag in the error voltage $e_e$ due to the thermal inertia of the furnace, so that the error voltage $e_e$ does not remain constant. It is these cyclic temperature variations producing fluctuations in the error voltage $e_e$ which prevent the SCR 22 from turning off immediately after it turns on, or from turning on immediately after it turns off, as is well known to those familiar with conventional time-proportioning systems. If the thermal inertia of the furnace is great and its cyclic temperature variations negligible, the present system nevertheless produces well defined on-off cycling. It has been found that the SCR 22 heats rapidly and increases its own temperature due to current flow therethrough during "on" periods, and cools quickly to decrease its temperature during "off" periods, but this effect is not reflected at the frequency of the individual half waves in the supply voltage $e_s$. As the temperature of the SCR material increases or decreases, the critical "firing" level of the voltage $e_o$ applied to the gate decreases or increases. In consequence, when the SCR is turned off and cools quickly, the capacitor voltage $e_c$ must rise through a finite amount in order to increase the potential at the input terminal I1, and thus to increase the output voltage $e_o$, sufficiently to cause the SCR to be turned on again. The converse is true after the SCR 22 turns on and its gate "firing" level decreases due to self-heating. Both the small cyclic variations in the furnace temperature and the self-heating and cooling variations in the gate "firing" level of the SCR 22 may contribute in producing well defined on-off cycling and preventing the SCR 22 from immediately turning off or on after it is turned on or off.

When the furnace temperature is greatly below or greatly above the set point, i.e., outside the proportioning band, then the lowest or highest value of the capacitor voltage $e_c$ cannot exert an overriding influence on the input signal $e_o'$ supplied to amplifier 19, and the SCR 22 simply remains on or off until the furnace temperature rises or falls into the proportioning band. Within the proportioning band, however, the ratio of the durations of the "off" and "on" periods is made to increase as the furnace temperature increases toward and passes above the set point. The furnace temperature will cycle slightly about the set point under equilibrium conditions with the resistance element 11 being energized sufficiently to make up for normal heat losses from the furnace. But instability and large overshoot or undershoot about the set point temperature will be avoided.

Simply by the addition of the permanently connected resistor R, the capacitor C, the transistor Q3 or an equivalent Zener diode, and the resistor R7, an on-off control system with two different circuit portions served by separate voltage sources is made to operate with time-proportioning action. No non-electric links, with their attendant complexity and operational delays, are required in the negative feedback loop. It is a simple matter to tailor the control apparatus to the characteristics of any particular furnace or other apparatus being controlled, since the time constant for the charging and discharging of a capacitor may be readily adjusted by changing the value of either the resistor R or the capacitor C.

Of course, the improvement of the present invention may be realized while nevertheless adapting various equivalents for the specific components of apparatus here described. Those skilled in the art will appreciate that only one differential amplifier or its equivalent need be used; that the polarity of the voltage source 20 may be reversed and type PNP transistors employed in the differential amplifier; that the final control element may be, instead of the SCR 22, any suitable voltage level discriminating current control device, for example, a Schmitt trigger circuit controlling a final transistor in series with the relay coil; that instead of a relay coil 14 controlling contacts in series with the condition changing component here exemplified by the heater element 11, the current responsive device may have a variety of forms, for example, an input winding for a magnetic amplifier or a pulse transformer connected to control the conduction of power SCR's in series with the element 11; and that any condition other than temperature, such as pressure, flow rates, and the like, may be controlled.

Still other modifications will be briefly described with reference to FIG. 4 which is generally like FIG. 1 and wherein like components are identified by the same reference characters. First, in the arrangement of FIG. 4, the set point voltage $e_d$ is derived from a voltage-dividing resistance bridge 40 supplied from the source terminals T1, T2 and having output terminals 41, 42 which are respectively connected to the input terminal I1' and the thermocouple 15. As the wiper of a potentiometer in the bridge is adjusted, the set point voltage $e_d$ is increased or decreased. That voltage is, in effect, connected in series opposition to the temperature-representing voltage $e_a$ so as to produce the error voltage $e_e$ which is applied between the input terminals I1' and I2'. The bridge 40 represents a preferred one of the many ways in which the set point voltage and the error voltage may be produced. Of course, the actual condition-representing voltage $e_a$ may be provided by any suitable transducer and need not be derived from a thermocouple.

Figure 4:
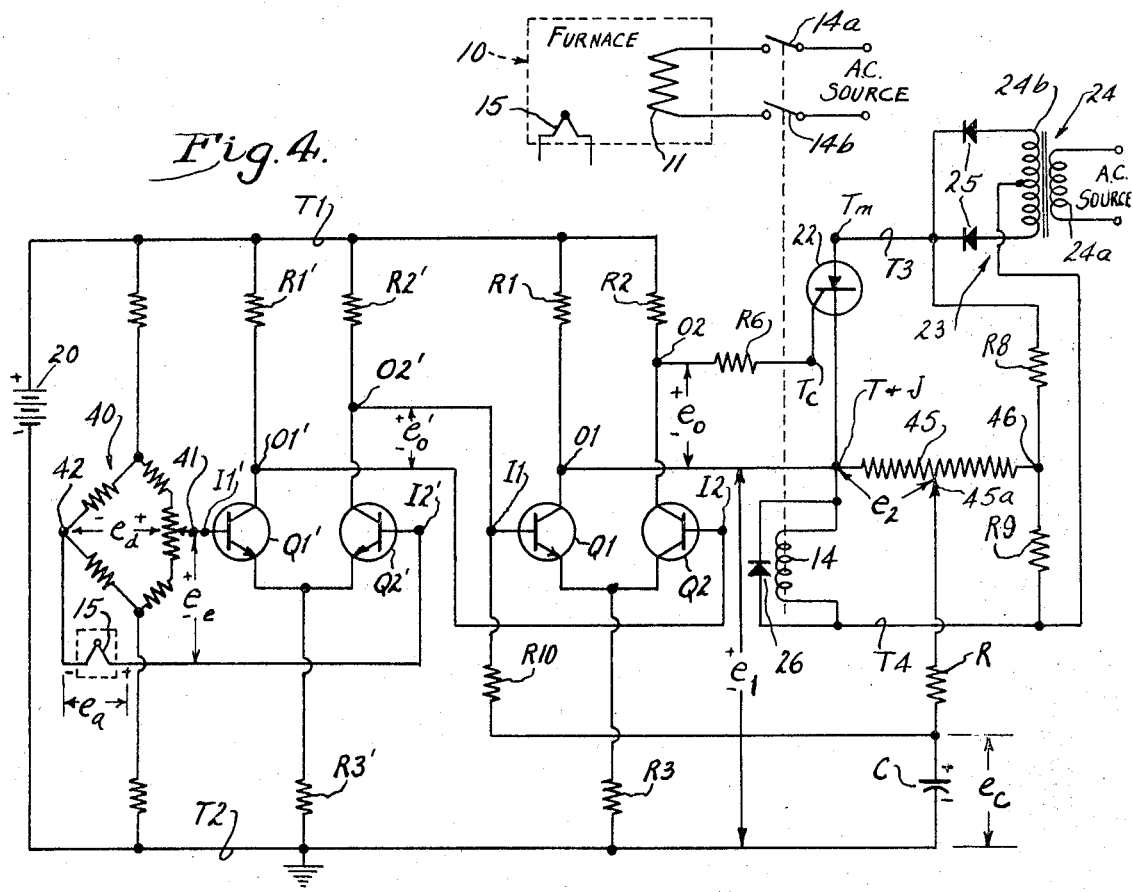
FIG. 4 is similar to FIG. 1 but shows certain alternatives or modifications which may be employed in the practice of the invention.

Secondly, in the apparatus of FIG. 4 the relay coil 14 and the SCR 22 are connected in reverse order, as compared to FIG. 1, between the positive and negative terminals T3, T4 of the voltage source 23. This is to illustrate the fact that the control element (SCR) and the controlling device (relay 14) need only be connected in series with the second voltage source, and that the step-change voltage across either one of these may be used to effect the charging and discharging of the capacitor C, so long as the connection back to the amplifier circuit is made to that one of the amplifier input terminals which gives the feedback action a negative sense. It will be apparent that in FIG. 4 the voltage across the relay coil 14 (from terminal T to terminal T4) will be low (substantially zero) when the SCR is non-conductive and high (about 24 volts in peak value) when the SCR is conductive. From this, it will be seen that the upper end of the capacitor need only be effectively connected (preferably through resistor R) to some point (e.g., T$m$ in FIG. 1, or via R, 45, R9 to T4 in FIG. 4) in the series circuit formed by source 24, SCR 22 and control device 14 other than the common terminal T and which undergoes step changes in its effective potential relative to the terminal T (neglecting pulsations) when the SCR 22 switches between conductive and non-conductive states; providing the feedback connection is in a negative sense, i.e., tends to turn the SCR 22 off or on as a result of the change in the capacitor voltage $e_c$ which occurs due to the SCR respectively turning on or off.

Moreover, the step-changeable voltage $e_2$ which determines the upper and lower levels (see 31 and 30 in FIGS. 2 and 3) toward which the capacitor C charges and discharges may be any selected fraction of the voltage which appears across the SCR 22 (FIG. 1) or relay coil 14 (FIG. 4), so that the width of the proportioning band (i.e., the range of the error in which time-proportioning on-off action occurs) may be varied. As shown in FIG. 4, the voltage $e_2$ changes according to changes in the voltage across the relay coil 14, and it appears between the terminal T and the adjustable wiper 45$a$ of a potentiometer 45. One extremity of the later is connected to the junction J between the SCR 22 and the coil 14 and its other end is connected to the common point 46 between two voltage dividing resistors R8, R9 serially connected between the terminals T3, T4. Thus, the potentiometer 45 and resistor R9 form a voltage divider in parallel with the coil 14, by which the upper end of the resistor R is effectively connected to the point T4 in a manner to receive an adjustable fraction of the step-changeable voltage between points T and T4. Assuming that the point 46 resides at 12 volts (peak value) relative to the terminal T4, and that the junction J resides at +24 volts and zero volts relative to the terminal T4 when the SCR 22 is conductive or non-conductive, then by adjustment of the wiper 45$a$, the "span" between the two values of the voltage $e_2$ may be varied over a considerable range. In other words, the potentiometer 45 associated with the voltage divider permits the user of the equipment to select an extent of the successive changes in the voltage $e_2$ which is a desired fraction of the second source voltage, and in this way to adjust the width of the proportioning band. Indeed, with the arrangement of FIG. 4, the voltage $e_2$ will have opposite polarities aiding or bucking the voltage $e_1$ when the SCR 22 is respectively off or on, to determine the maximum and minimum values toward which the capacitor voltage $e_c$ rises or falls.

The voltage $e_2$ is supplied through the resistor R to the upper plate of the capacitor C in FIG. 4, as previously described with reference to FIG. 1. However, because that voltage $e_2$ is derived from the changeable voltage appearing across the relay coil 14, it will add to or subtract from the voltage $e_1$ when the SCR 22 is respectively off or on, so that the capacitor C will respectively charge or discharge, as previously described with respect to FIG. 1. The upper plate of the capacitor C is connected via a current-limiting resistor R10 to the input terminal I1 of the amplifier 19 so that an increase or decrease in voltage $e_2$ causes a timed increase or decrease in the output voltage $e_o$, thereby making the sense of the feedback action negative and producing the same operation as previously described with reference to FIG. 1. Moreover, the arrangement shown in FIG. 4 indicates that it is not essential in the practice of the invention to employ a transistor Q3 or an equivalent Zener diode in the feedback path; it is permissible simply to connect the upper plate of the capacitor C to the appropriate one of the amplified input terminals. That is, the emitter-base junction of the transistor Q3 (FIG. 1) in acting as a Zener diode creates a substantially constant voltage drop or bias to make the input terminal I1 change through an appropriate range of potentials even though the voltage sources 20 and 23 have widely different values. But where the source voltage values are properly related or the upper and lower values of the voltage $e_2$ is adjustable as in FIG. 4, the transistor Q3 of FIG. 1, or its Zener diode equivalent, may be omitted.

Figure 5:
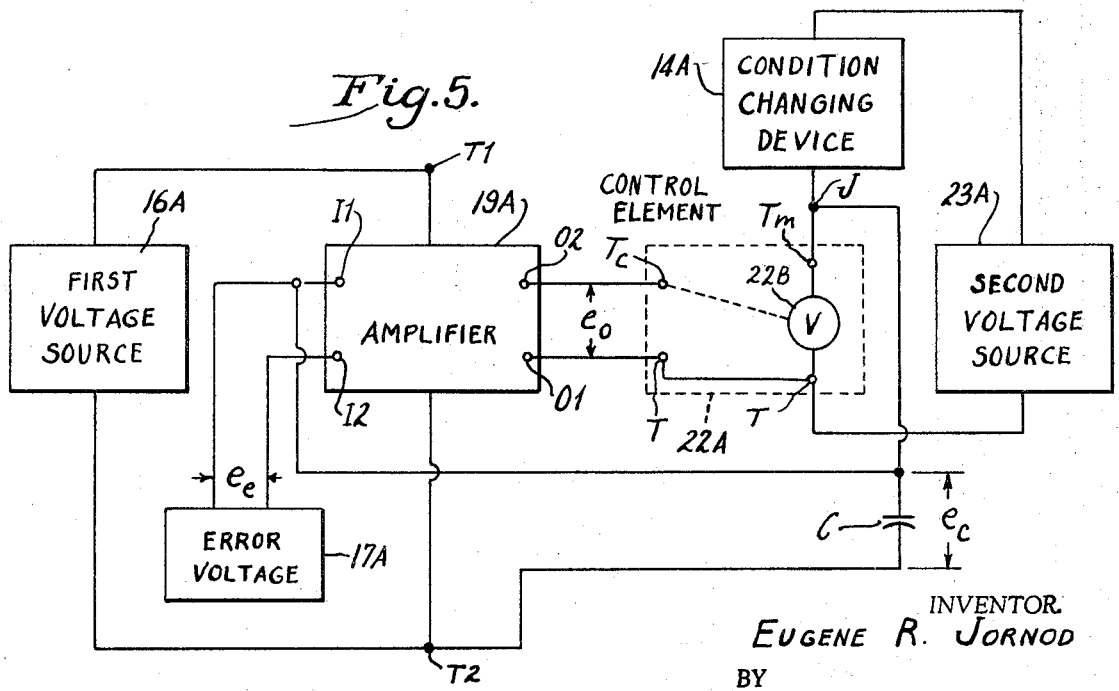
FIG. 5 is a generalized circuit diagram, partly in block form, which makes clear the organization of the present system and improvement divorced from immaterial details.

The common aspects of FIGS. 1 and 4, and the apparatus for practicing the present invention may be better understood with freedom from immaterial details by inspection of FIG. 5. As there shown in a generalized fashion, a first circuit forming an amplifier 19A is connected to receive its operating voltage from the terminals T1, T2 of a first voltage source 16A. The amplifier receives the error signal $e_e$ derived from any suitable error voltage source 17A between the two input terminals I1, I2 and produces a corresponding output signal $e_o$ between its output terminals O1, O2. These output terminals are connected respectively to the common terminal T and the control terminal T$c$ of a three-terminal control element 22A (illustrated in functional, diagrammatic form) having its main current path between terminals T$m$ and T connected in series with the current-responsive condition-changing device 14A and a second voltage source 23A. The element 22A, in effect, functions as an electric valve 22B controlled by the voltage between terminals T$c$ and T to open or close when the output signal $e_o$ from the amplifier rises above or falls below a predetermined magnitude. The valve 22B thus permits or prevents excitation of the device 14A.

To provide negative feedback with a time function, a first plate of the capacitor C is connected to the junction J between the element 22A and the device 14A, and the second plate is connected to the terminal T2 of the first voltage source. A resistor is not essential in this connection because resistors otherwise present in the amplifier or the other circuits may adequately provide the desired time constant for charging and discharging.

Finally, the first plate of the capacitor C is suitably connected to that one of the input terminals (here shown as the terminal I1) of the amplifier 19A which results in the voltage $e_o$ decreasing or increasing when the capacitor voltage $e_c$ changes due to the element 22A switching from off to on or vice versa. Thus, negative feedback with a time function, and time-proportioning action is obtained by the operation which has already been described in detail. A very simple, low cost, trouble-free, and permanent interconnection between two separate circuits served by different voltage sources in an on-off control system yields the desired time-proportioning feedback action.

I claim as my invention:

1. In a time-proportioning on-off system responsive to an error signal for bringing a variable condition to and maintain it substantially at a desired set point by average corrective action proportional to the error, such system including means for connecting a first voltage source between terminals T1 and T2, an amplifier connected to receive an operating voltage from said terminals T1 and T2, said amplifier having input terminals I1 and I2 coupled to receive said error signal therebetween and having output terminals O1 and O2 between which its amplified output signal appears and which reside at potentials different from those of the terminals T1 and T2, a three terminal control element having a control terminal $T_c$ and a common terminal T and constituting means to render the path between a main terminal $T_m$ and the common terminal T conductive when said output signal exceeds a predetermined magnitude, a second voltage source, means including a device responsive to current excitation and de-excitation for respectively causing said variable condition to change in one direction or the other, and means connecting said device, said second voltage source and the terminals $T_m$ and T of said element in a series circuit, and said series circuit being connected to said amplifier and its first source only by connections from said output terminals O1 and O2 to said terminals T and $T_c$; the improvement which comprises, in combination, a capacitor having first and second plates, means effectively connecting said first plate to a point in said series circuit other than said common terminal T and which undergoes step changes in effective potential relative to said terminal T as said element switches between conductive and non-conductive states, means for directly connecting said second plate to said terminal T2 of said first voltage source, and means for applying the voltage appearing across said capacitor to the input of said amplifier in a negative feedback sense such that when said control element switches to conductive or non-conductive states the resulting change in said capacitor voltage tends to restore the element respectively to its non-conductive or conductive state, whereby said device is turned on and off with time proportioning according to the magnitude of the error signal.

2. The improvement set forth in claim 1 further characterized in that said control element is a triggered electronic valve.

3. The improvement set forth in claim 1 further characterized in that said means for effectively connecting is constituted by a resistor.

4. In a system responsive to an error signal for maintaining a variable condition substantially at a desired set point by time-proportioned on-off action, such system including a first voltage source having terminals T1, T2 connected to supply an operating voltage to a differential amplifier which receives said error signal between its input terminals I1, I2 and produces between its output terminals O1, O2 an output signal; said output terminals O1, O2 both being non-common to both of said terminals T1, T2 and residing at potentials which differ from the potentials of the terminals T1, T2; a silicon controlled rectifier (SCR) having a gate, anode, and cathode; means connecting said terminals O1 and O2 respectively to said cathode and gate, a second source of pulsating voltage; means including a device responsive to current excitation or de-excitation for changing said variable condition in one sense or the other; and means connecting said second voltage source, said device and the anode-cathode path of said SCR in a series circuit; the improvement which comprises means serially connecting a resistor and a capacitor in the order named between (a) a point in said series circuit other than said cathode and which undergoes step changes in effective pulsating potential relative to said cathode as a consequence of said SCR switching between conductive and non-conductive states, and (b) said first source terminal T2; and means coupling the connection point between said resistor and capacitor to that one of said amplifier input terminals I1, I2 which causes negative feedback action such that when said SCR switches to its conductive or non-conductive state the resultant change in the voltage across said capacitor tends to restore said SCR respectively to its non-conductive or conductive state.

5. The improvement set forth in claim 4 further characterized in that said serially connecting means includes means for applying to one end of said resistor an adjustable fraction of the voltage which appears between said point in said series circuit and said cathode.

6. The improvement set forth in claim 4 further characterized in that said coupling means includes a P-N junction device and a resistor connected between said connection point and one input of said amplifier with the P-N junction being poled to oppose flow of current from said connection point to said input except when under Zener breakdown.

References Cited

UNITED STATES PATENTS

| | | | |
|---|---|---|---|
| 2,779,872 | 1/1957 | Patterson | 330—69 X |
| 3,158,759 | 11/1964 | Jasper | 328—146 X |
| 3,358,218 | 12/1967 | Halpin | 307—284 X |
| 3,435,257 | 3/1969 | Lawrie | 307—291 |

DONALD D. FORRER, Primary Examiner

R. C. WOODBRIDGE, Assistant Examiner

U.S. Cl. X.R.

307—305; 328—3, 146, 175; 330—30, 69